United States Patent Office 2,713,561
Patented July 19, 1955

2,713,561

RECLAIMING NATURAL AND SYNTHETIC RUBBER WITH BIS(TETRAALKYLPHENOL) SULFIDES

Wendell S. Cook, Houghton, Mich., and George E. P. Smith, Jr., Akron, Ohio, assignors to The Firestone Tire & Rubber Company, Akron, Ohio, a corporation of Ohio No Drawing. Original application June 29, 1949, Serial No. 102,154, now Patent No. 2,605,288, dated July 29, 1952. Divided and this application August 2, 1951, Serial No. 245,432

2 Claims. (Cl. 260—2.3)

This invention relates to the reclaiming of vulcanized rubbery copolymer of styrene and 1,3-butadiene, and vulcanized mixtures of such copolymer and natural rubber. This application is a division of our copending application Serial No. 102,154, filed June 29, 1949, and matured into U. S. 2,605,288.

"Reclaiming" as used herein may be understood to mean treating or processing waste vulcanized materials of the class outlined immediately above in such a manner that the products obtained thereby are plastic and processable and thus capable of again being utilized to produce new articles of manufacture.

The vulcanizates which can be reclaimed according to the present invention are the vulcanizates which contain combined sulfur. They may be obtained by vulcanizing with sulfur, sulfur halides, polysulfides of phenols or cresols, dialkyl xanthogen sulfides, tetraalkylthiuram sulfides or other sulfides known to vulcanize chemically unsaturated elastomers. Vulcanization may be effected with or without an accelerator. The invention includes new reclaiming agents as well as a process of reclaiming.

Fundamental to a successful reclaiming operation is the reduction of a vulcanizate to a plastic workable mass. In the case of vulcanized natural rubber this may be accomplished by heat alone if maintained at a temperature substantially above that at which vulcanization occurred and for a sufficient length of time. In addition, however, certain oils and resins which act as swelling agents, plasticizers or tackifiers (e. g., solvent naphthas, turpentine, dipentene, asphalt, pine tar, rosin, coumarone resins, rosin oil, etc.) are usually added to assist the process.

Also useful but to be distinguished from the oils and resins last mentioned are certain chemicals which act catalytically to hasten the reclaiming process rather than in a solvent or lubricating manner. Natural rubber has, for example, been reclaimed using such catalytic acting chemicals at temperatures as low as 150° F.

With the advent of GR–S (butadiene-styrene copolymer) during World War II new problems confronted the reclaimer. Vulcanizates of this substance do not behave as do those of natural rubber. Rather than having a softening or plasticating effect, heat renders them harder and more unworkable. Large portions of oils of the solvent or lubricating variety were necessary to produce a workable material. But due to the large quantities of oils used, the physical properties of the resultant material were very poor. Therefore, catalytic type reclaiming additives, which will be active in relatively small amounts and especially those effective on synthetic rubber, become very important.

An object is to provide a method of reclaiming synthetic rubbers, particularly those of the butadiene-styrene polymer type.

Another object is to provide reclaimed vulcanizates having improved physical properties.

A still further object is to provide an improved method for the reclaiming of synthetic type rubbers.

The above and further objects will be manifest in the description of the invention which follows.

It has been found that members of a new class of chemical compounds are effective as reclaiming agents for vulcanized rubber and rubber-like compounds. These chemicals are of particular value in the reclaiming of vulcanized GR–S type synthetic rubber and vulcanized mixtures containing both natural rubber and GR–S. Relatively small proportions of the compounds are required.

The new chemical compounds suitable for practice of the invention are the tetraalkylphenol sulfides and are believed to have the following formula

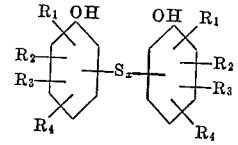

wherein $R_1$, $R_2$, $R_3$, and $R_4$ are alkyl groups and $x$ is an integer from 1 to 4 but preferably 1 or 2. Depending upon which atom of the phenol nucleus is open for reaction with sulfur, the sulfur linkage may be ortho, meta or para to the OH group.

These tetraalkylphenol sulfides may be conveniently prepared by reacting a suitable tetraalkylphenol with sulfur chloride in an inert solvent such as carbon tetrachloride or ethylene dichloride. The sulfide produced with sulfur monochloride is preferred but products produced from all sulfur chlorides are active and are included in the invention.

Illustrative of the preparation of these materials 13 g. of 2,3,5,6-tetramethylphenol was dissolved in 300 cc. of carbon tetrachloride. Another solution was prepared by dissolving 5 g. of sulfur dichloride in 10 cc. of carbon tetrachloride. The sulfur chloride solution was added dropwise to the tetramethylphenol solution. During the addition a white solid separated. When all of the sulfur chloride had been added the resulting mixture was stirred and refluxed for thirty minutes and allowed to stand overnight. The mixture was filtered and 10.7 g. of crude bis (2,3,5,6-tetramethylphenol) sulfide as a slightly yellow powder was collected on the filter. The crude product was recrystallized producing thin needles which melted at 236°–237° C. The following analytical results were obtained.

| | Percent calculated for $C_{20}H_{26}O_2S$ | Percent found |
|---|---|---|
| Sulfur | 9.70 | 9.69 |

Other tetraalkylphenol sulfides of the invention may be prepared in the manner illustrated above by reacting a sulfur chloride with 2,3,4-trimethyl-6-ethylphenol
3,4,5,6-tetramethylphenol
2,3,5-trimethyl-6-isopropylphenol
2,6-di-tert-butyl-3,5-dimethylphenol
2,3,4,6-tetramethylphenol
2,3,5,6-tetraethylphenol
3,4,5,6-tetrabutylphenol
2,5-dimethyl-4,6-diisopropylphenol
4-methyl-2,3,6-triethylphenol
2,3,4,6-tetrabutylphenol
3-methyl-4,5,6-triethylphenol
3-methyl-2,5,6-triisopropylphenol Indicative of value of a reclaimed rubber are the following qualities—softness, body, tack, and sheeting facility. "Softness" (which may be characterized as lack of "nerve") may be determined by setting a refining mill to such a spacing that a piece of soft lead when passed between the rolls of the mill is squeezed to a thickness of 0.005 inch. The thickness of a sheeted reclaim is a function of the degree of softening of such reclaim—the greater the thickness of the sheeted reclaim, the less the softening and vice versa.

"Body" is that property of a reclaimed rubber which permits it to be stretched without tearing and having undue surface irregularities. "Tack" is a quality of adhesiveness which is desirable in reclaimed rubber in that it facilitates fabrication of a composite article in which one element must be adhered to another before the article is vulcanized. Since the two qualities last mentioned do not lend themselves well to instrument evaluation, they are customarily determined by hand estimation.

The body ratings used in establishing the merit of the present invention were estimated by observing the stretch or elongation of a refined sheet stretched by hand and by the appearance and uniformity of the stretched sheet, and were recorded as good (G), fair (F), poor (P), tough (T), and lacey (L) or some combination thereof.

Tack was estimated by laying a portion of the refined reclaimed sheet across the hand and then pressing the thumb and first finger together. When the thumb and first finger were spread apart, a small but definite force was required to separate the two adhering surfaces. A rating of 5 was given to the force required to separate a sheet of typical natural rubber whole tire reclaim. Milled crude rubber was given a rating of 10, and crude GR–S with no tack was given a rating of 0. (The higher the number the better the tack.) Values between these assigned controls were estimated by the observer and could be duplicated easily by different independent observers with an accuracy of plus or minus one unit.

The facility of sheeting was noted by which roll the sheet adhered to on each pass (F—fast roll, S—slow roll, N—neither roll). Best sheeting is reflected by adherence to the fast roll, poorest by adhering to neither.

A 200 gram batch of the following formula was mixed for ten minutes in a Baker-Perkins mixer.

| | Parts by weight |
|---|---|
| Ground GR–S tread scrap (5 mesh) | 100 |
| Dipentene fraction [a] (B. P. 173°–201° C.) | 6 |
| Coumarone indene resin [b] | 6 |
| 2,3,5,6-tetramethylphenol sulfide | 1.5 |

[a] Solvenol, supplied by Hercules Powder Company.
[b] Cumar 2½ MH, supplied by Barrett Division, Allied Chemical and Dye Corporation.

The mixed batch was then cooked for 4 hours in a pan heater at 175 p. s. i. steam pressure (377° F.). The batch was then dried, cooled, mill-massed and subjected to three refining passes. Sheeting facility was recorded after each pass. Thickness, body and tack were observed and recorded after the third refining pass as follows

| | |
|---|---|
| Thickness inches | 0.0075 |
| Body | F |
| Tack | 3 |
| Sheeting | SFF |

The value of the tetraalkylphenol sulfides of the present invention becomes apparent by comparing the results obtained above, showing that the product of the invention is suitable for use as reclaimed rubber, with a run made in the absence of such sulfides but with all other variables identical. A 200 gram batch of the following formula was mixed for ten minutes in a Baker-Perkins mixer.

| | Parts by weight |
|---|---|
| Ground GR–S tread scrap (5 mesh) | 100 |
| Dipentene fraction (B. P. 173°–201° C.) | 6.75 |
| Coumarone indene resin | 6.75 |

(It should be noted that the total weight of materials added to the scrap rubber here is the same as the total weight including the tetramethylphenol sulfide in the first instance.) The mixed batch was then cooked for 4 hours in a pan heater at 175 p. s. i. steam pressure (377° F.). The batch was then dried, cooled, milled-massed and subjected to three refining passes. The observations and results were taken and recorded as before with the following results.

| | |
|---|---|
| Thickness inches | .020 |
| Body | P–L |
| Tack | 1— |
| Sheeting | SSF |

The product here obtained, without benefit of the use of a tetraalkylphenol sulfide, was of very inferior quality and could not be considered as reclaimed.

The invention is not limited to the specific conditions or quantities set forth herein. The temperatures set forth above, though preferred, are not critical and may well be varied within a range of 150° to 550° F. depending largely upon process and commercial considerations. Crude tetraalkylphenol sulfides are equally as effective in reclaiming as are the pure compounds. The amount of the sulfides required to produce the desired results is not particularly critical and may well be varied from 0.05 to 10 parts by weight for every 100 parts of vulcanized scrap. Other variations appearing naturally to those skilled in the art are within the contemplation of the present invention.

What is claimed is:
1. A process of reclaiming a vulcanized rubbery copolymer of styrene and 1,3-butadiene which comprises heating the vulcanized copolymer at a temperature in the range of 150° F. to 550° F. in the presence of bis (2,3,5,6-tetramethylphenol) sulfide.
2. A process of reclaiming a vulcanized mixture of natural rubber and a copolymer of styrene and 1,3-butadiene which comprises heating the vulcanized mixture at a temperature in the range of 150° F. to 550° F. in the presence of a bis (2,3,5,6-tetramethylphenol) sulfide.

References Cited in the file of this patent

UNITED STATES PATENTS

| 2,359,122 | Kirby | Sept. 26, 1944 |
| 2,495,145 | Smith et al. | Jan. 17, 1950 |
| 2,605,241 | Albert | July 29, 1952 |

OTHER REFERENCES

Cook et al.: Ind. and Eng. Chem., July 1948, pages 1194–1202.